United States Patent
Pignataro et al.

(10) Patent No.: US 12,470,671 B2
(45) Date of Patent: Nov. 11, 2025

(54) DYNAMIC ENERGY-SAVING VIDEO TRANSMISSIONS FOR SUSTAINABLE COLLABORATION

(71) Applicant: Cisco Technology, Inc., San Jose, CA (US)

(72) Inventors: Carlos Pignataro, Cary, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 18/194,353

(22) Filed: Mar. 31, 2023

(65) Prior Publication Data

US 2024/0333876 A1 Oct. 3, 2024

(51) Int. Cl.
*H04N 7/15* (2006.01)
*G06F 3/01* (2006.01)
*G06V 20/40* (2022.01)

(52) U.S. Cl.
CPC ............ *H04N 7/157* (2013.01); *G06F 3/017* (2013.01); *G06V 20/44* (2022.01); *H04N 7/152* (2013.01)

(58) Field of Classification Search
CPC ........ H04N 7/157; H04N 7/152; H04N 7/147; G06F 3/017; G06V 20/44
See application file for complete search history.

(56) References Cited

U.S. PATENT DOCUMENTS

| | | | |
|---|---|---|---|
| 9,942,514 B1* | 4/2018 | Panwar | H04W 52/028 |
| 10,771,272 B1* | 9/2020 | Ghanaie-Sichanie | H04W 28/24 |
| 2005/0078171 A1 | 4/2005 | Firestone et al. | |
| 2006/0215016 A1 | 9/2006 | Cohen et al. | |
| 2007/0211141 A1 | 9/2007 | Christiansen | |
| 2011/0310217 A1 | 12/2011 | Lee et al. | |
| 2013/0100228 A1* | 4/2013 | Tapia | H04N 21/26216 348/14.01 |

(Continued)

OTHER PUBLICATIONS

PCT/US2024/021228 filed Mar. 22, 2024 International Search Report and Written Opinion dated Jul. 30, 2024.

*Primary Examiner* — Stella L. Woo
(74) *Attorney, Agent, or Firm* — Rutan & Tucker, LLP; Ravi Mohan; Marc A. McClain

(57) ABSTRACT

Devices, systems, methods, and processes for dynamically reducing the size of a video transmission are described herein. An energy-saving video transmission device can include a controller, a memory, a communication port coupled with at least a second device, and a virtual meeting logic configured to establish a virtual meeting with a video transmission. The video transmission is transmitted to at least the second device. The virtual meeting logic can determine a virtual meeting configuration and collect sustainability attributes data. Based on the collected data, an energy-saving video transmission rate can be selected. Often, this can indicate how often to capture and transmit keyframes of the video transmission instead of the entire video transmission. Finally, based on the energy-saving video transmission rate, a reduced size video transmission can be transmitted over a network. Subsequently, additional events can be detected that allow for the dynamic adjustment of the energy-saving video transmission rate.

20 Claims, 11 Drawing Sheets

(56) References Cited

U.S. PATENT DOCUMENTS

| | | | |
|---|---|---|---|
| 2013/0141518 A1* | 6/2013 | Chou | H04N 7/148 |
| | | | 348/14.08 |
| 2014/0064165 A1* | 3/2014 | Chung | H04N 7/15 |
| | | | 370/311 |
| 2014/0192133 A1* | 7/2014 | Cheung | H04N 19/53 |
| | | | 348/14.1 |
| 2014/0340469 A1* | 11/2014 | Swanson | H04N 7/14 |
| | | | 348/14.09 |
| 2015/0381930 A1 | 12/2015 | Quinn et al. | |
| 2016/0173819 A1* | 6/2016 | Kitazawa | H04N 19/103 |
| | | | 348/14.08 |
| 2016/0219248 A1* | 7/2016 | Reznik | H04N 21/4223 |
| 2017/0278546 A1 | 9/2017 | Xiao et al. | |
| 2017/0280098 A1 | 9/2017 | Sethuraman et al. | |
| 2019/0268601 A1 | 8/2019 | Lu et al. | |
| 2021/0076002 A1 | 3/2021 | Peters et al. | |
| 2022/0201052 A1* | 6/2022 | Fitzpatrick | H04N 7/147 |
| 2023/0065847 A1* | 3/2023 | Sipcic | H04N 7/147 |

* cited by examiner

DYNAMIC ENERGY-SAVING VIDEO TRANSMISSIONS FOR SUSTAINABLE COLLABORATION

The present disclosure relates to online meeting collaborations. More particularly, the present disclosure relates to dynamically determining a variable energy-saving video transmission rate for video presentations within a virtual meeting to facilitate more sustainable collaborations.

BACKGROUND

Virtual meetings have become increasingly popular in recent years, especially since the COVID-19 pandemic made remote work and social distancing the norm. Virtual meetings can refer to any type of meeting that takes place over the internet, using video conferencing software or other tools. These tools can be operated on personal computing devices and even mobile computing devices such as smartphones, tablets, etc.

Virtual meetings have many advantages. For example, people can collaborate from anywhere in the world, which is especially helpful for teams that are distributed across different locations. Virtual meetings also save time and money by eliminating the need for travel, as well as reducing the need for physical office space. In addition, virtual meetings can be recorded, which can be useful for reviewing discussions and decisions later on.

During a virtual meeting, participants generate and transmit various types of data. This includes audio data, such as speech and background noise captured by microphones, and video data, such as images of participants and their surroundings captured by cameras. Text data, including chat messages and typed messages, is also generated, and transmitted between participants. Additionally, screen sharing data, which includes content shared from one participant's screen to others, and metadata, such as the date and time of the meeting and participant information, are also transmitted.

The video data that is transmitted during a virtual meeting includes images of the participants and their surroundings, as captured by the cameras on their devices. This data can include live video of participants speaking or listening, as well as any movements or gestures they make during the meeting. The video data may constitute a large portion of the data transmitted during a virtual meeting. As a result, many resources may be utilized to facilitate the transmission of this data. These resources can include the use of electricity generated from a variety of non-sustainable power sources.

SUMMARY OF THE DISCLOSURE

Systems and methods for dynamically generating and transmitting energy-saving video transmissions during virtual meetings in accordance with embodiments of the disclosure are described herein. In a number of embodiments, this may include a controller, a memory communicatively coupled to the controller, and a communication port coupled with a second device. A virtual meeting logic is configured to establish a virtual meeting including at least one video transmission. This may also include determining a virtual meeting configuration, collecting sustainability attributes data, and selecting an energy-saving video transmission rate based on the collected sustainability attributes data. Finally, video may be transmitted at a reduced size based on the selected energy-saving video transmission rate.

In additional embodiments, the virtual meeting logic is further configured to select a key frame of video for retaining in the at least one video transmission and retain the selected key frame of video for the selected period of delay.

In further embodiments, the virtual meeting logic is further configured to dynamically adjust the energy-saving video transmission rate based on a subsequent event in the at least one video transmission.

In more embodiments, the event is related to a subject captured within the at least one video transmission.

In some embodiments, the event is the subject present within the at least one video transmission.

In various embodiments, the event is the subject gesturing on the at least one video transmission.

In still additional embodiments, the event is the subject gesturing on the at least one video transmission, the virtual meeting logic selects a decreased period of frame delay.

In certain embodiments, the virtual meeting configuration includes determining one or more processing capabilities of the device.

In still further embodiments, the virtual meeting configuration includes determining an expected number of attendees to the virtual meeting.

In yet more embodiments, the virtual meeting configuration includes determining a quantity of video transmissions within the virtual meeting.

In a variety of embodiments, the sustainability attributes data includes at least determining a power source type being utilized by the device.

In some more embodiments, the selected energy-saving video transmission rate is increased when the power source type being utilized is a non-sustainable power source.

Additional further embodiments include conducting a sustainable virtual meeting, including establishing a virtual meeting between at least two network-connected devices including at least one video transmission. These embodiments may further determine a virtual meeting configuration, collect sustainability attributes data associated with the at least two network-connected devices, and a set of network paths between the at least two network-connected devices. An energy-saving video transmission rate for each of the at least two network-connected devices is selected based on the collected sustainability attributes data.

In various more embodiments, the method further includes transmitting a plurality of energy-saving video transmission commands to each of the at least two network-connected devices, the energy-saving video transmission commands are configured to direct a network-connected device to transmit a reduced size video transmission during the established virtual meeting.

In still more embodiments, the virtual meeting configuration includes determining one or more processing capabilities of the at least two network-connected devices.

In some number of embodiments, the method further includes receiving the at least one video transmission, processing the received at least one video transmission, selecting a frame of video for retaining in the at least one video transmission, and transmitting the selected frame of video within the at least one video transmission for the selected energy-saving video transmission rate.

In yet further embodiments, the virtual meeting configuration includes determining a quantity of video transmissions within the virtual meeting.

In various additional embodiments, the sustainability attributes data includes at least determining a power source type being utilized by the at least two network-connected devices and the set of network paths between the at least two network-connected devices.

In some variety of embodiments, the selected energy-saving video transmission rate is decreased when the power source type being utilized is a non-sustainable power source.

Still yet more embodiments include, a controller and a memory communicatively coupled to the controller. Also included may be a communication port coupled with a second device, and a virtual meeting logic configured to establish a virtual meeting with at least the second device. The virtual meeting includes at least one video transmission, and can transmit one or more device configurations, and receive reduced frame rate data, the reduced frame rate data is based on at least the one or more device configurations and associated sustainability attributes data and transmit a reduced number of video frames based on the reduced frame rate data.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein.

Figure 1:
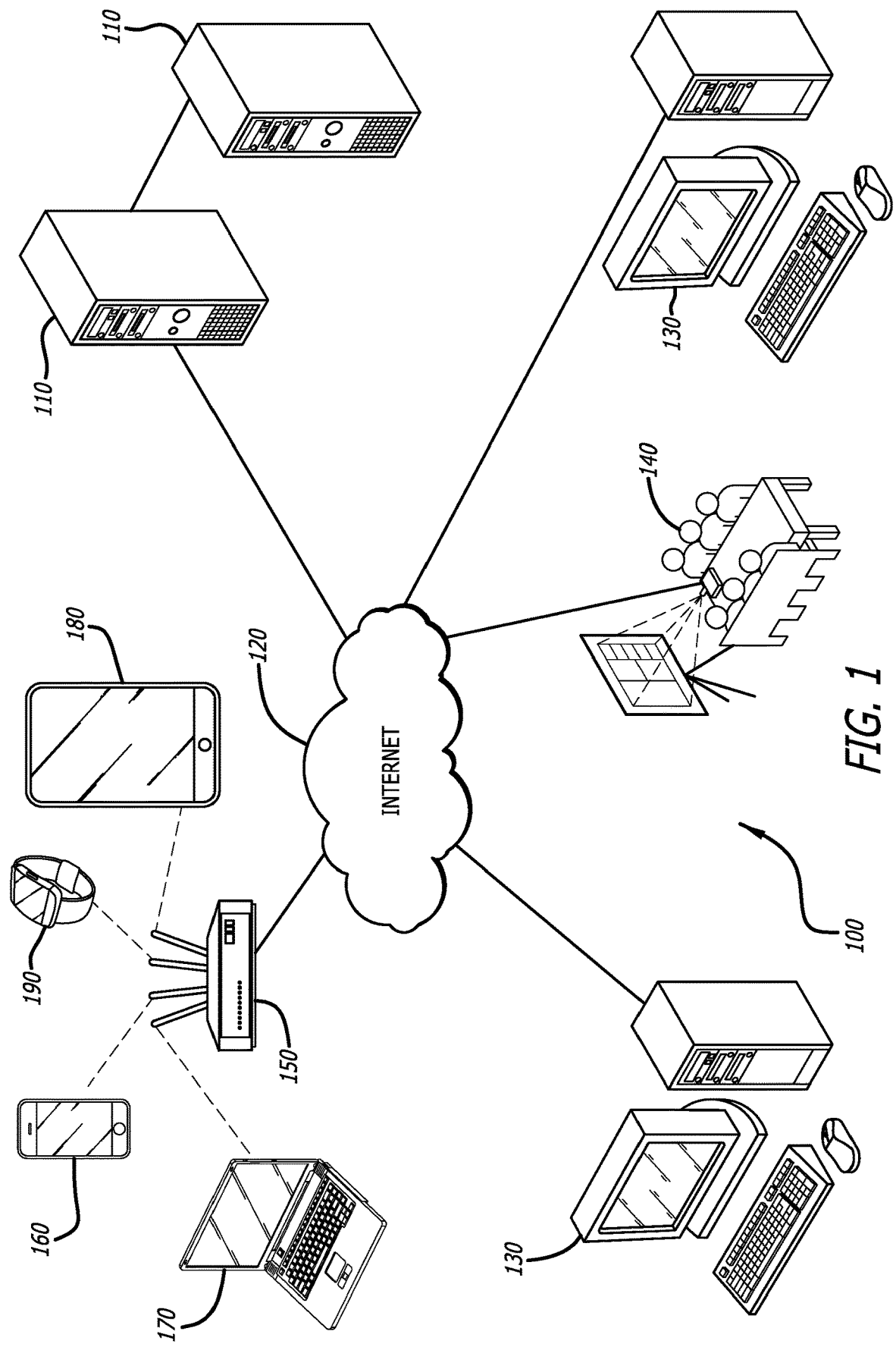
FIG. 1 is a conceptual illustration of a network with network devices powered suitable for dynamic video reduced size video transmission data rate collaborations in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that allow for conducting virtual meetings with a video transmission that is configured to require fewer frames and less data of video transmitted over the network. In additional embodiments, the virtual meetings may also examine and configure the source of electricity that is powering the devices within the network that is conducting the virtual meeting. By utilizing these methods, a virtual meeting can be conducted that can require less electricity to conduct, either by transferring less data and/or by selecting video transmission settings based on the power sources available to the network.

As described in more detail below, various virtual meetings can have one or more video transmissions that can be processed by a virtual meeting service within a network, or by a personal computing device utilized by an attendee of the virtual meeting. The processing of the video transmission can analyze how the video transmission size may be reduced by introducing an energy-saving video transmission rate that can indicate when video transmissions can "skip" frames. Instead of simply showing a lower frame rate, one or more key frames may be selected that can be held or retained on the video, or in certain embodiments, have a plurality of in-between frames that can be generated on the local computing device to simulate motion within the video transmission such that the user experience is not compromised.

In more embodiments, the virtual meeting, either through a virtual meeting service, or via a client device application, can detect one or more events that can provide an opportunity to reduce the data transmitted over the network. As described in more detail below, the events can range from determining if a subject is present within the camera range of the virtual meeting, to whether the subject is speaking or gesturing. In additional embodiments, the events may further be related to participants being on mute for a period of time, the user not having the video transmission as the active screen, etc. By tracking these events, the energy-saving video transmission rate can be dynamically changed. This dynamic change is often focused on maintaining user experience. Although user experience can be subjective, various embodiments may utilize a set of minimum performance thresholds to quantify and act as a baseline user experience that can be maintained.

In many embodiments, a method of retaining user experience is to utilize one or more selected keyframes in the video transmission. A keyframe may be selected and then transmitted to the virtual meeting service servers or other client devices associated with the virtual meeting. Instead of transmitting additional frames of video, the keyframe may be processed by an external device such that it is retained on the virtual meeting display until a new keyframe is received. In further embodiments, the client device or virtual meeting service may generate additional in-between frames that can be displayed within the video transmission between keyframes. In this way, a reduced size video can be transmitted over the network, while fidelity and/or user experience may be unaffected at the destination device. The in-between frames may be morphed or otherwise generated via one or more machine-learning methods. Additionally, one or more specialized processes may be utilized to select keyframes such that the subject is in focus, is looking at the camera, or is otherwise visually pleasing to the users of the destination devices of the virtual meeting.

The more keyframes that are selected, the larger the reduced size video transmission will be, and the lower the overall energy-saving video transmission rate will be. At one end, the selection of keyframes can be often enough that a full frame rate video is captured and transmitted, yielding little to no energy-savings. Conversely, depending on the triggering events, the selection of keyframes can become so low that only a single keyframe is displayed on the destination client device as a frozen or static picture. This can be done until a subsequent event occurs that requires a decrease in the overall energy savings to retain a satisfactory user experience.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual illustration of a network 100 with network devices powered suitable for dynamic reduced size video transmission data rate collaborations in accordance with various embodiments of the disclosure is shown. In many embodiments, the network 100 may comprise a plurality of devices that are configured to transmit and receive data related to providing, recording, and processing virtual meetings (i.e., online collaborations). In various embodiments, virtual meeting service servers 110 are connected to a wide-area network such as, for example, the Internet 120. In further embodiments, virtual meeting service servers 110 can be configured to transmit a variety of data across the Internet 120 to any number of computing devices such as, but not limited to, personal computers 130, virtual presentation devices 140, and mobile computing devices including laptop computers 170, cellular phones 160, portable tablet computers 180 and wearable computing devices 190. In additional embodiments, virtual meeting data may be mirrored or otherwise supplemented in additional cloud-based service provider servers or edge network systems. In still additional embodiments, the virtual meeting service servers 110 can be hosted as virtual servers within a cloud-based service.

In further embodiments, the sending and receiving of virtual meeting data can occur over the Internet 120 through wired and/or wireless connections. In the embodiment depicted in FIG. 1, the mobile computing devices are connected wirelessly to the Internet 120 via a wireless network access point 150. It should be understood by those skilled in the art that the types of wired and/or wireless connections between devices on the network 100 can be comprised of any combination of devices and connections as needed.

In various embodiments, the network 100 may broadly accept virtual meeting data, such as, but not limited to audio and video data from users via personal computers 130, virtual presentation devices 140, and/or mobile computing devices. These embodiments may, based on one or more thresholds or other network conditions/configurations, that video data may need to be transmitted to very other device within a virtual meeting. This may require determining the quantity of video transmissions within the virtual meeting. In more embodiments, the video being transmitted within the video data can utilize a reduced size video transmission data rate to transmit video frames at a lower rate than the standard frame rate, thereby reducing the amount of data that needs to be transmitted and processed over the Internet 120.

As discussed in more detail below, virtual meetings can be established that have a certain configuration. Based upon this configuration, various sustainability attributes data can be collected. A reduced size video transmission rate can be selected based on the collected sustainability attributes data which allows for the transmission of a reduced size video transmission within a video stream of the virtual meeting. The amount of reduction of transmitted video frames can vary based on one or more thresholds and/or subsequent events. Based on these changes during a virtual meeting, the amount of video transmission data can be adjusted either to increase the reduced size video transmission data rate or decrease it.

Although a specific embodiment for a network 100 suitable for utilizing a reduced size video transmission data rate within a virtual meeting is described above with respect to FIG. 1, any of a variety of systems and/or processes may be utilized in accordance with embodiments of the disclosure. For example, the virtual meeting service servers 110 may be configured to receive video data and transfer it to another device within the network 100. In this way, it may be configured as a relay of the video data which can select the reduced size video transmission data rate within the video data transmission. However, in some embodiments, the selection of reduced size video transmission data rate can be done on one or more user devices. The elements depicted in FIG. 1 may also be interchangeable with other elements of FIGS. 2-11 as required to realize a particularly desired embodiment.

Figure 2:
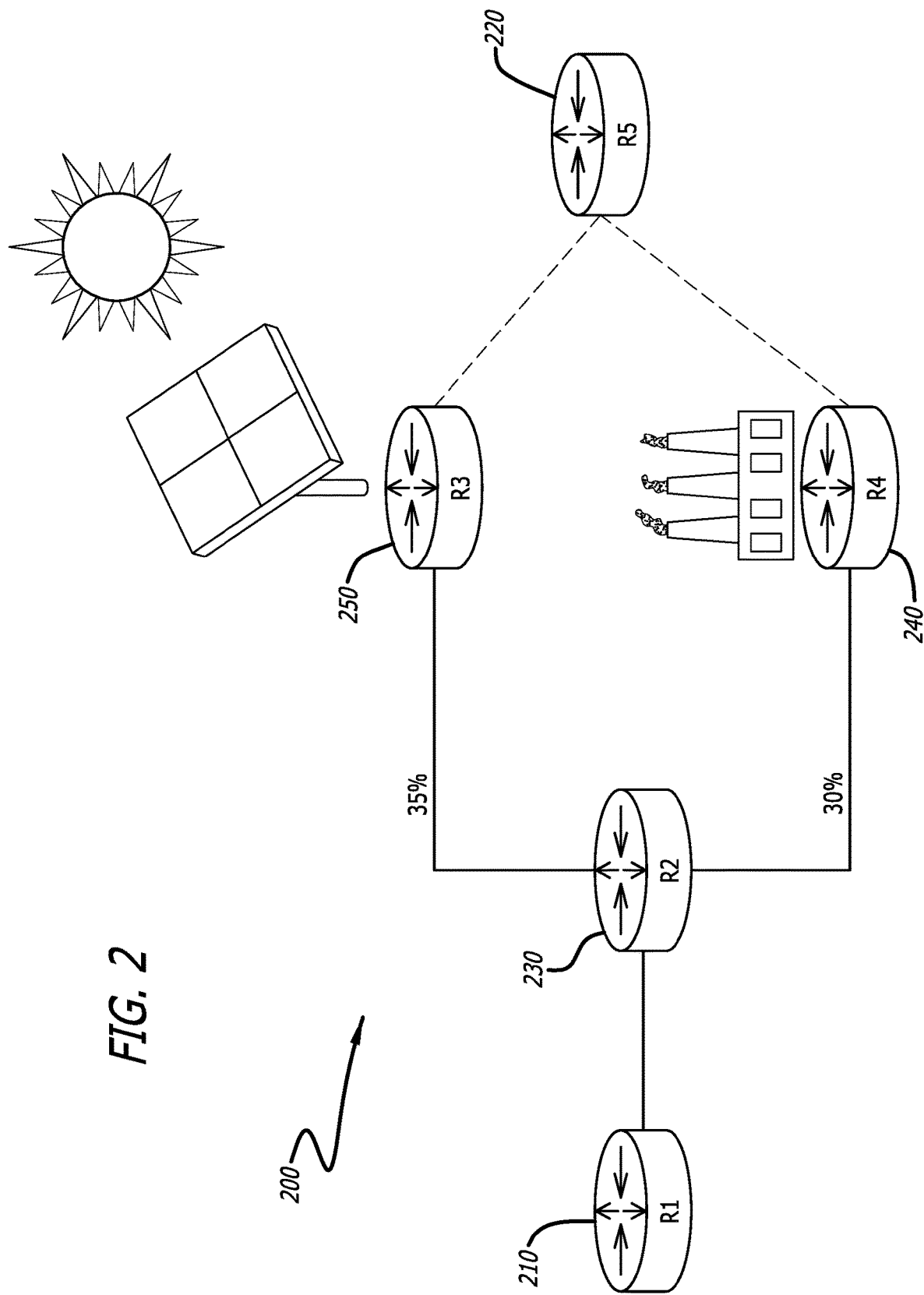
FIG. 2 is a simplified diagram of a network of devices suitable for virtual meetings powered by different power sources in accordance with various embodiments of the disclosure.

Referring to FIG. 2, a simplified diagram of a network of devices suitable for virtual meetings powered by various power source types in accordance with various embodiments of the disclosure is shown. The network 200 can include a plurality of devices, e.g., routers, which can be in communication with each other and/or a remote server, which may be connected to the network via a router 220 (R5). The network 200 depicted in FIG. 2 is shown as a simplified, conceptual network where a router 210 (R1) is connected to a router 230 (R2) which may route data to router 250 (R3) or router 240 (R4) onward to router 220 (R5). Those skilled in the art will understand that a network 200 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," "power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 200 have not considered various aspects of operation that can relate to the overall sustainability of the network. For example, devices in communication networks have often used grid-supplied energy as a primary power source. This grid-supplied energy can regularly provide energy that has been generated by a non-sustainable or negative environmental impacts-heavy power source such as a coal-powered power plant. However, modern power grids often have more diverse and cleaner energy sources for the provided generated energy. Some devices can still be powered by power sources that utilize fossil fuels, such as the router 240 (R4) as depicted in FIG. 2. Alternatively, some devices can operate by using renewable sources of energy, such as the router 250 (R3) which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability attributes.

In the embodiment depicted in FIG. 2, the operation of a non-sustainable coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to a subsequent event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability attributes of that network device. During operation, one or more devices within the network may seek and collect the sustainability attributes of various network devices, which can provide insight into both the type of power source providing power to the device, but also the various capabilities of the network device that may be activated to provide more efficient operation.

Additionally, when generating various scores, metrics, or other evaluations of the network devices within a network 200, the sustainability attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 200 is described above with respect to FIG. 2, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 2 may also be interchangeable with other elements of FIGS. 1 and 3-8 as required to realize a particularly desired embodiment.

Figure 3:
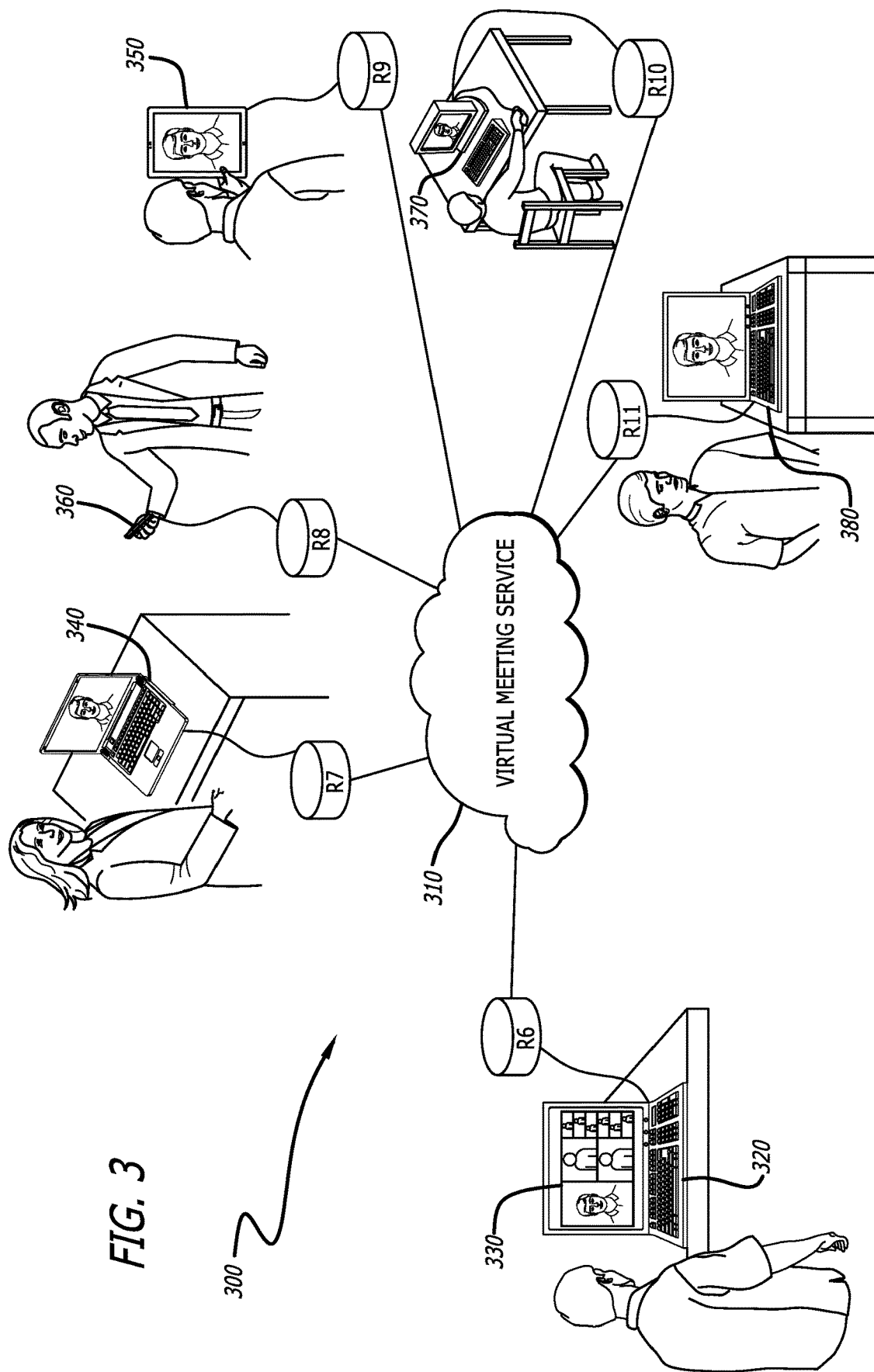
FIG. 3 is a conceptual schematic diagram of a one-to-many virtual meeting in accordance with various embodiments of the disclosure.

Referring to FIG. 3, a conceptual schematic diagram of a one-to-many virtual meeting 300 in accordance with various embodiments of the disclosure is shown. In some virtual meetings, it can be configured such that one (or a few) people are the main subjects of the meeting and that many other attendees will be primarily watching them. During these one-to-many meetings, there is a majority of dialogue from the presenter to the attendees.

In the embodiment depicted in FIG. 3, the presenter may utilize their personal computing device, such as a first laptop 320 to capture and generate a video transmission (conceptually shown as the subject captured in frame). The virtual meeting can be facilitated by a virtual meeting service 310 that can connect one or more attendees together. The presenter may connect to the virtual meeting service over a network through a plurality of network devices (conceptually shown as router R6). During the presentation of the virtual meeting, the video transmission 330 can be transmitted to the various attendees, such as to a second laptop 340 (through a plurality of network devices conceptually shown as router R7), a smartphone 360 (through a plurality of network devices conceptually shown as router R8), a tablet 350 (through a plurality of network devices conceptually shown as router R9), a desktop computer (through a plurality of network devices conceptually shown as router R10), and a third laptop 380 (through a plurality of network devices conceptually shown as router R11).

During the virtual meeting, the video transmission 330 can be shown on each of the network-connected devices of the attendees. However, to reduce the amount of data that is required to be transmitted by the virtual meeting service 310, the video transmission 330 may have an associated reduced size video transmission rate that limits frame transmissions between selected keyframes. In this way, not every frame captured by the first laptop 320 needs to be incorporated into the video transmission 330. In these embodiments, the video transmission 330 can be reduced in size by only transmitting keyframes and, in some embodiments, metadata that can indicate to the network connected devices of the attendees that one or more key frames of data are to be displayed for a certain period of time or until a new keyframe arrives.

In some embodiments, the virtual meeting service 310 may receive a video transmission 330 that includes a full data stream (non-compressed, etc.) from the presenter and determine a best energy-saving video transmission rate for each attendee based on one or more factors. For example, if a user is not present or is not paying attention to the video transmission 330, then the reduced size video transmission rate can be increased to further lower the data transmitted. Whereas, if an attendee is focused on the video transmission, or if the presenter is moving around or using gestures, the reduced size video transmission rate between key frames can be decreased, down to zero if needed to maintain the user experience during the virtual meeting.

Figure 4:
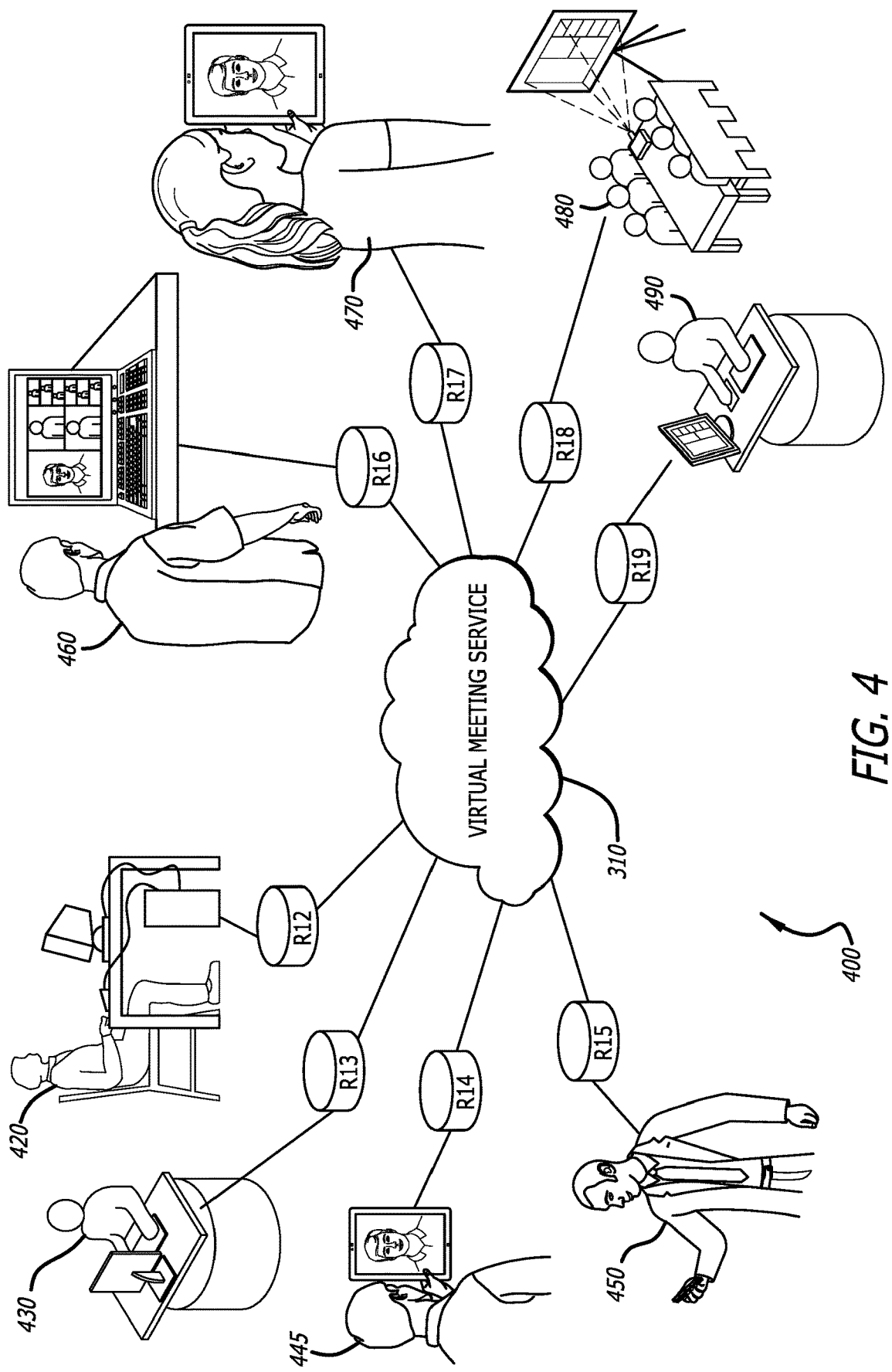
FIG. 4 is a conceptual schematic diagram of a many-to-many virtual meeting in accordance with various embodiments of the disclosure.

Referring to FIG. 4, a conceptual schematic diagram of a many-to-many virtual meeting 400 in accordance with various embodiments of the disclosure is shown. In some virtual meetings, it can be configured such that everyone can be the main subject of the meeting depending on who is speaking. During these many-to-many meetings, no attendee necessarily has a majority of dialogue during the meeting.

In the embodiment depicted in FIG. 4, the attendees 420-490 may utilize their available computing devices, such as, but not limited to, laptop computers, desktop computers, smartphones, tablets, and/or presentation devices to capture and generate a video transmission. This may require determining the quantity of video transmissions within the virtual meeting. These computing devices can each be connected to a virtual meeting service 310 through a plurality of network devices conceptually shown as routers R12-R19. The virtual meeting service 310 can connect one or more attendees together.

Similar to the virtual meeting depicted in FIG. 3, the video transmission can be shown on each of the network-connected devices of the attendees 420-490. However, to reduce the amount of data that is required to be transmitted by the virtual meeting service 310, the video transmission may have an associated reduced size video transmission rate which can limit video transmission to one or more selected keyframes. In this way, not every frame captured by the various computing devices needs to be incorporated into the video transmission. In these embodiments, the video transmission can be reduced in size by only transmitting keyframes and, in some embodiments, metadata that can indicate to the network connected devices of the attendees 420-490 that one or more key frames of data are to be displayed for a certain period of time or until a new keyframe arrives.

Although specific embodiments for virtual meetings are described above with respect to FIGS. 3-4, any of a variety of systems and/or processes may be utilized in accordance with embodiments of the disclosure. For example, the virtual meetings may be conducted in a peer-to-peer configuration wherein the processes carried out by the virtual meeting service 310 are instead conducted on one or more of the client applications within the computing devices of the attendees. The elements depicted in FIGS. 3-4 may also be interchangeable with other elements of FIGS. 1-2 and 5-11 as required to realize a particularly desired embodiment.

Figure 5:
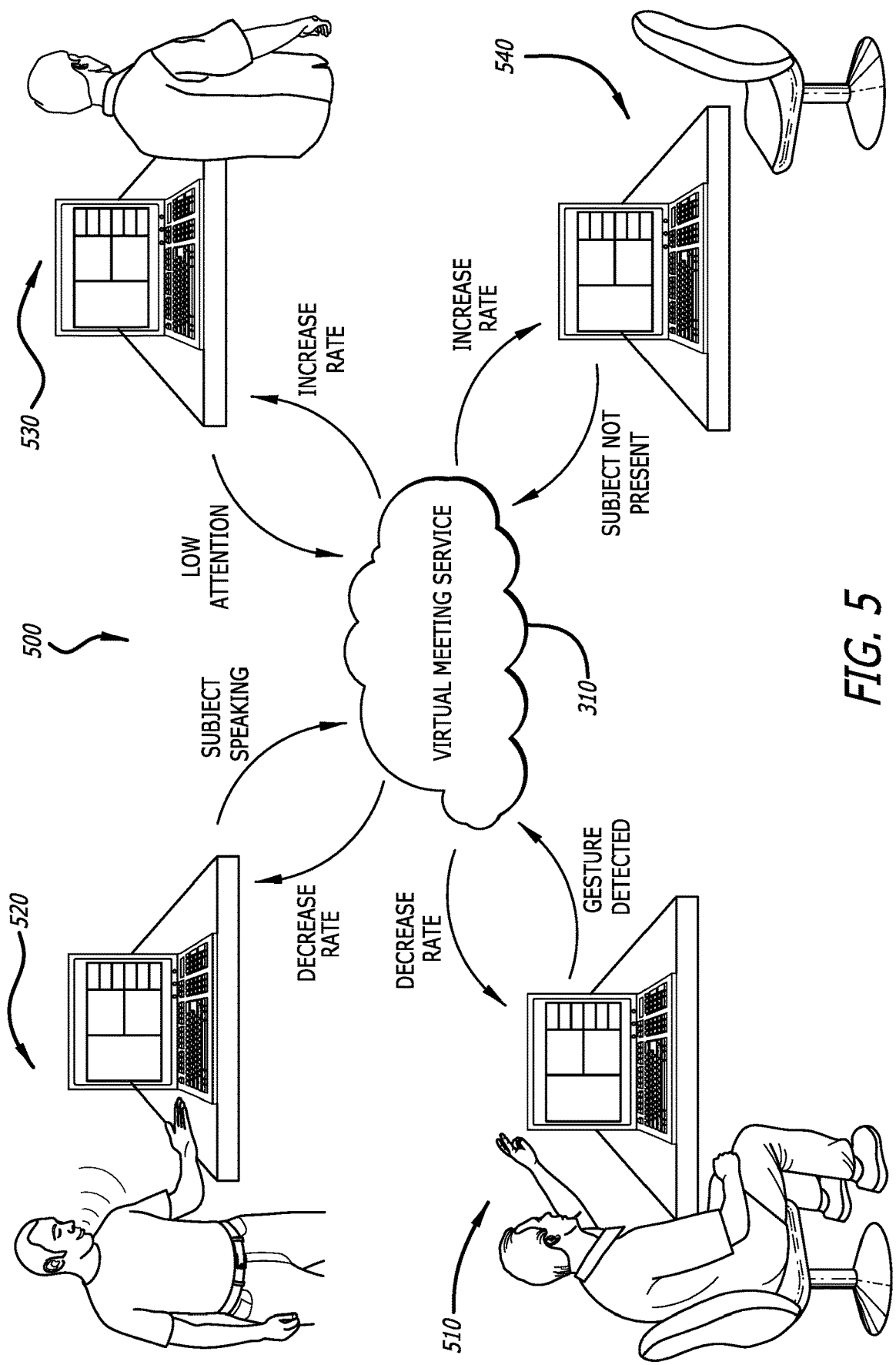
FIG. 5 is a conceptual illustration of various events that can trigger a change in the reduced size video transmission in accordance with various embodiments of the disclosure.

Referring to FIG. 5, a conceptual illustration of various events 500 that can trigger a change in the reduced size video transmission in accordance with various embodiments of the disclosure is shown. It is contemplated that once an energy-saving video transmission rate is determined that it may be dynamically changed in response to one or more detected events associated with the virtual meeting. For example, in a first event 510, the attendee may be attempting to get someone's attention by using a gesture. In response, the attendee's personal computing device may generate and transmit a signal indicating a detected gesture to the virtual meeting service 310. As a result, the virtual meeting service 310 may decrease the energy-saving video transmission rate for that specific attendee, allowing for more keyframes to be incorporated into the video transmission. In this way, the motion and video of that attendee can be more easily perceived by other attendees of the virtual meeting, which provides for maintaining user experience.

In a second event 520, the attendee is speaking during the meeting. This can often lead to other attendees focusing on that attendee's video transmission for a given period of time. In response, the attendee's personal computing device can also generate and transmit a signal indicating a detected speaking role to the virtual meeting service 310. This can result in the virtual meeting service 310 sending a command/signal to decrease the energy-saving video transmission rate for that specific attendee by increasing the number of selected keyframes incorporated into the video transmission. In this way, the motion and video of that attendee can be more easily perceived by other attendees of the virtual meeting, which provides for maintaining user experience.

In a third event 530, the attendee may not be paying attention to the video transmission. If the attendee is not aware of the video transmission, or is aware of it only tangentially, then there is an opportunity to reduce the data size of the video transmission for that attendee. Thus, the personal computing device of the attendee can generate and send a signal to the virtual meeting service for an increase in the energy-saving video transmission rate, which can conversely reduce the overall data size of the video transmission. In response, the virtual meeting service can transmit a signal to the attendee's personal computing device to increase the energy-saving video transmission rate of the video transmission.

Finally, during a fourth event 540, the attendee is not even present and has left the camera range. In these instances, there is not a need to transmit all frames of a video transmission. Thus, again, the personal computing device of the attendee can generate and send a signal to the virtual meeting service for an increase the energy-saving video transmission rate which can further decrease the number of keyframes incorporated into the video transmission, and perhaps even stop transmitting keyframes altogether in certain embodiments. In response, the virtual meeting service can transmit a signal to the attendee's personal computing device to increase the reduced size video transmission data rate of the video transmission. In some embodiments, the reduced size video transmission rate may be indefinitely until it is detected that the subject is captured back within the camera range.

Although a specific embodiment for dynamically changing the frame rate of a video transmission in response to an event is described above with respect to FIG. 5, any of a variety of systems and/or processes may be utilized in accordance with embodiments of the disclosure. For example, the dynamic change in reduced size video transmission data rate periods may be done internally within the client applications associated with the virtual meeting. The elements depicted in FIG. 5 may also be interchangeable with other elements of FIGS. 1-4 and 6-11 as required to realize a particularly desired embodiment.

Figure 6:
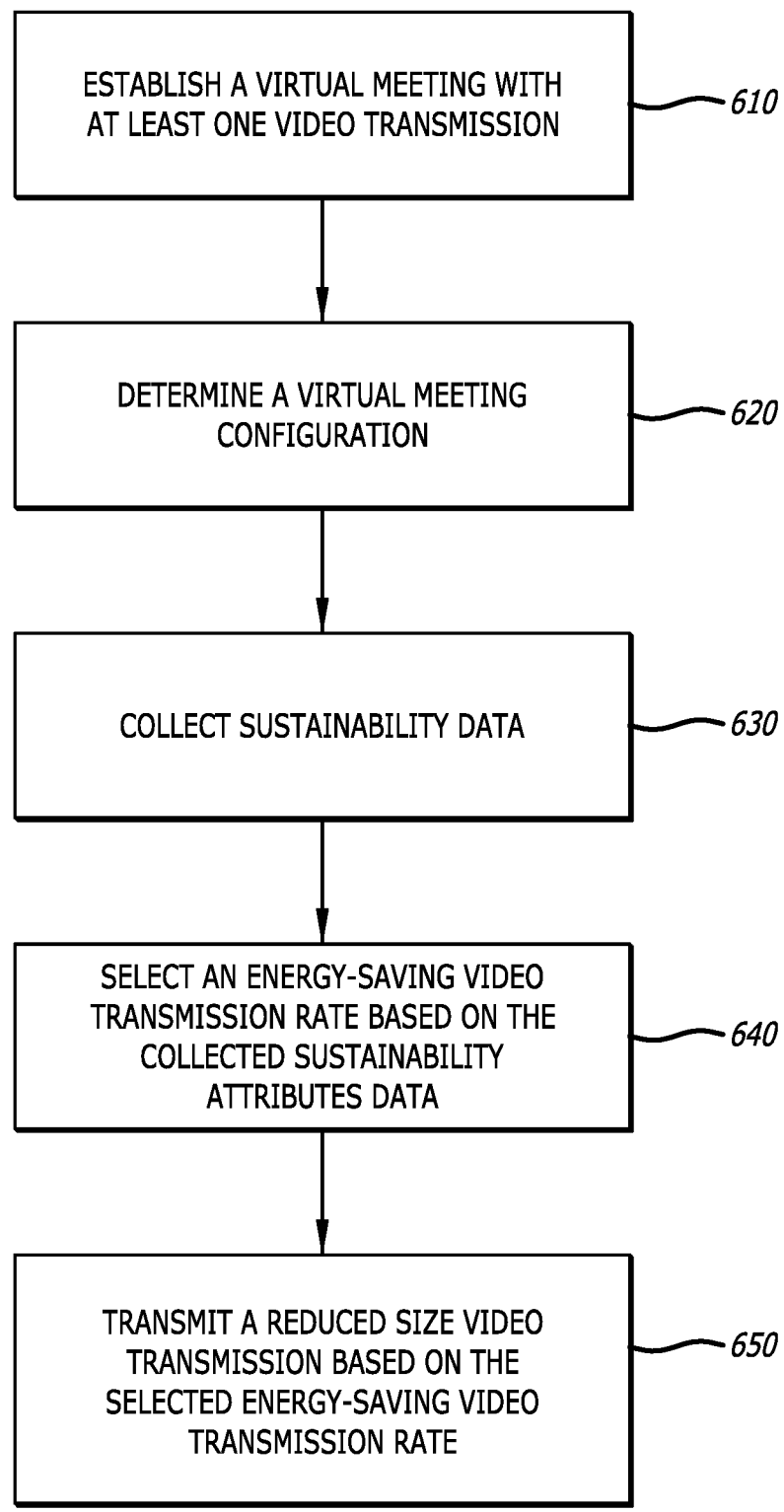
FIG. 6 is a flowchart depicting a process for transmitting a reduced size video within a virtual meeting user device in accordance with various embodiments of the disclosure.

Referring to FIG. 6, a flowchart depicting a process 600 for transmitting a reduced size video within a virtual meeting user device in accordance with various embodiments of the disclosure is shown. In many embodiments, the process 600 can establish a virtual meeting with at least one video transmission (block 610). As described above, the virtual meeting can be any of a number of configurations including, but not limited to, a many-to-one or a many-to-many virtual meeting. In certain embodiments, the establishment of the virtual meeting can be upon the connection of various devices to conduct the meeting. In some embodiments, the establishment of the virtual meeting can be in response to the generation of a meeting invite based upon the expected number of attendees and their historical patterns can be utilized for further processing.

Upon establishing of the virtual meeting, one or more meeting configurations can be determined (block 620). The configuration can be generated upon issuing a virtual meeting invite based on the invited attendees and their past known devices and/or locations. The time for the meeting may also be considered. In some embodiments, the configuration can be generated upon establishing a connection between one or more user devices when starting the virtual meeting. In still more embodiments, a configuration can be generated initially and be updated upon starting the meeting.

In a number of embodiments, the process 600 can collect sustainability data (block 630). As described above, sustainability data can include various data related to device capabilities to the type of power source powering the device. In some embodiments, the sustainability data may be gathered prior to the virtual meeting either by accessed previously cached or stored data relating to one or more of the invited attendees. In additional embodiments, the sustainability data may be gathered upon connection of one or more attendees to the virtual meeting.

In a variety of embodiments, the process 600 can select an energy-saving video transmission rate based on the collected sustainability data (block 640). As discussed in more detail above, an energy-saving video transmission rate may indicate how many keyframes are to be selected and transmitted within the video transmission. Colloquially, this can be roughly be understood as the framerate of the video feed within a virtual meeting, however, one or more key frames are subsequently retained or indicated for retainment by the destination device with one or more in-between frames generated by the destination device. The larger the energy-saving video transmission rate, the fewer keyframes of video that are selected and transmitted, which increases the overall efficiency of the virtual meeting as less data is required to be transmitted across the network.

As such, the process 600 can transmit a reduced size video transmission of the at least one video transmission based on the selected energy-saving video transmission rate (block 650). It is contemplated that a reduction in the selection of the number of keyframes is desired to be as large as possible without affecting perceptible performance of the virtual meeting. As described above, situations where a user isn't looking at their screen or even present within the room may allow for a much smaller energy-saving video transmission rate compared to an active user focusing on a speaker with dynamic movement, etc. As those skilled in the art will recognize, the amount of acceptable reduced size video transmission data rate can be adjusted dynamically based on a large number of factors, and the decision of the amount of reduced size video transmission data rate can be determined at the user device level or by a virtual meeting service server, etc.

Although a specific embodiment for a utilizing a reduced size video transmission data rate within a virtual meeting user device is described above with respect to FIG. 6, any of a variety of systems and/or processes may be utilized in accordance with embodiments of the disclosure. For example, the process 600 may be carried out by a server within the virtual meeting service system. Additionally, the elements described in FIG. 6 may also be interchangeable with other elements of FIGS. 1-5 and 7-11 as required to realize a particularly desired embodiment.

Figure 7:
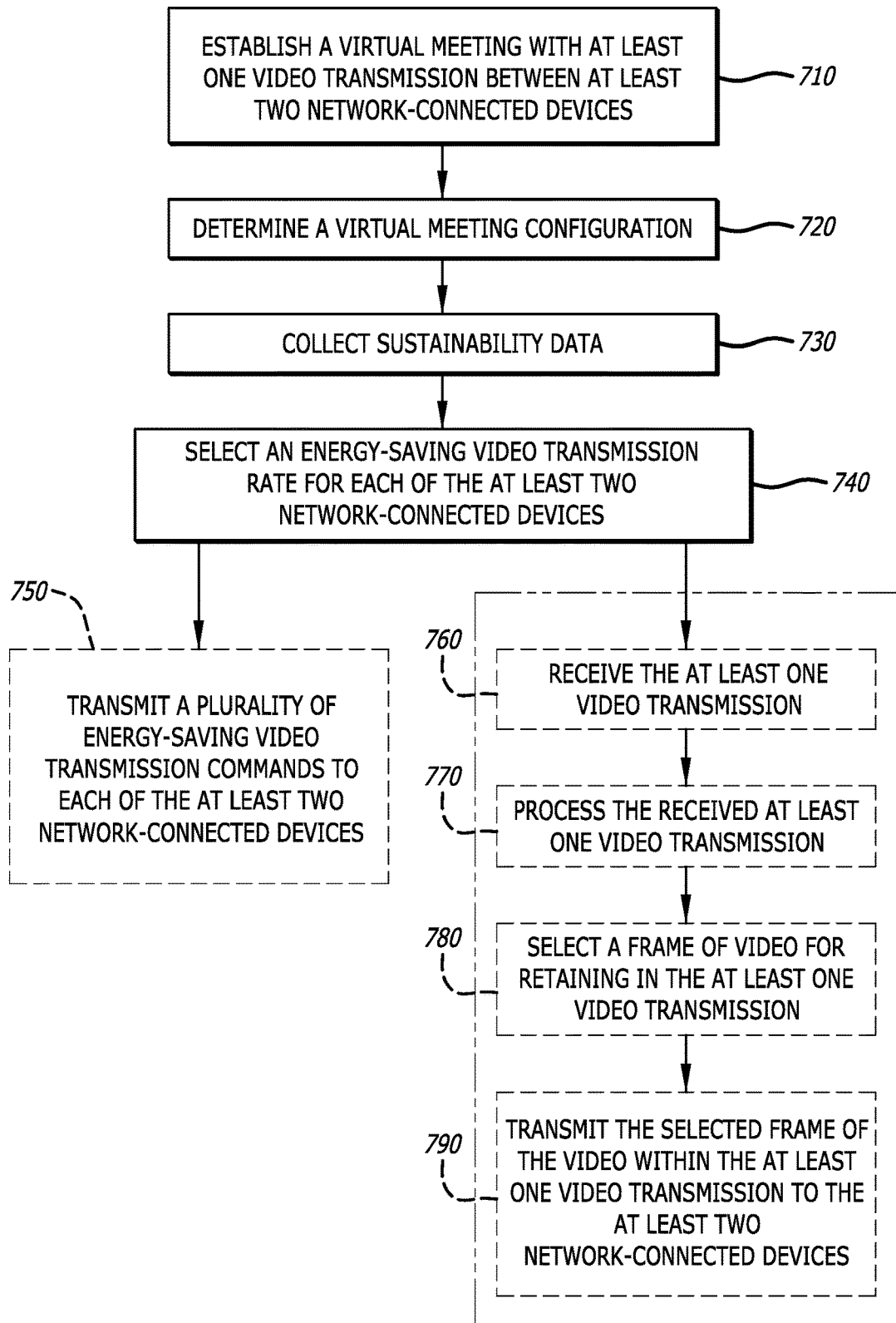
FIG. 7 is a flowchart depicting a process for utilizing a reduced size video transmission data rate within a virtual meeting service device in accordance with various embodiments of the disclosure.

Referring to FIG. 7, a flowchart depicting a process 700 for utilizing a reduced size video transmission data rate within a virtual meeting service device in accordance with various embodiments of the disclosure is shown. In many embodiments, the process 700 can establish a virtual meeting with at least one video transmission between at least two network-connected devices (block 710). However, as described above in the discussion of FIGS. 4-5, a variety of different network-connected devices may be established within a virtual meeting.

In additional embodiments, the process 700 can determine a virtual meeting configuration (block 720). Similar to the process 600 described above, the virtual meeting configuration can be established at the generation of the meeting invite, or upon connection of the at least two network-connected devices. Additionally, an initial virtual meeting configuration may be determined upon generating the meeting invite, and then adjusted, supplemented, or otherwise changed upon establishing the connection between the at least two network-connected devices.

In further embodiments, the process 700 can collect sustainability data (block 730). Again, as described above, sustainability data can include various data related to device capabilities to the type of power source powering the device. In some embodiments, the sustainability data may be gathered prior to the virtual meeting either by accessed previously cached or stored data relating to one or more of the invited attendees. In additional embodiments, the sustainability data may be gathered upon connection of one or more attendees to the virtual meeting.

In a number of embodiments, the process 700 can select an energy-saving video transmission rate for each of the at least two network-connected devices (block 740). In some optional embodiments, the process 700 may transmit a plurality of energy-saving video transmission commands associated with the selected energy-saving video transmission rate to the at least two network-connected devices (block 750). In these embodiments, a virtual meeting service server may act as a controller to determine the energy-saving video transmission rate for each of the network-connected devices within the virtual meeting. Thus, the transmission of the plurality of energy-saving video transmission commands can be received and processed by the devices associated with one or more users. These can be considered centralized embodiments wherein one remote controller can generate the reduced size video transmission data rate determinations for the user devices connected to the virtual meeting.

However, in some embodiments, the process 700 may receive at least one video transmission (block 760). This is often part of the virtual meeting. In further embodiments, the process 700 can process the received at least one video transmission (block 770). In many embodiments, the processing of the video transmission can include displaying one or more video streams on a virtual meeting screen of the user device. The process 700 can, in some embodiments, select a keyframe of video for retaining in the at least one video transmission (block 780). As described above, one or more methods can be utilized to determine a suitable keyframe to select for display within the video transmission until a next keyframe is selected. In this way, the selected video frame can be "held" or otherwise retained on the video transmission for the user device. As a result, various embodiments can transmit the selected frame of the video within the at least one video transmission to the at least two network-connected devices (block 790).

In this way, the user devices can select the energy-saving video transmission rate and utilize this selected period to transmit a selected keyframe of a video transmission for the given reduced size video transmission. Thus, fewer frames of video may be transmitted over the network. In certain embodiments, clients on one or more user devices may be configured to receive keyframes within a video transmission and with one or more indicating signals or other metadata, can be triggered to display the key frame for a given period fo time or until a subsequent keyframe is received.

Although a specific embodiment for a process 700 for utilizing a reduced size video transmission data rate within a virtual meeting service device is described above with respect to FIG. 7, any of a variety of systems and/or processes may be utilized in accordance with embodiments of the disclosure. For example, the generation of energy-saving video transmission rate data/commands may be done in both the user device/client and the virtual meeting server devices. The elements described in FIG. 7 may also be interchangeable with other elements of FIGS. 1-6, and 8-11 as required to realize a particularly desired embodiment.

Figure 8:
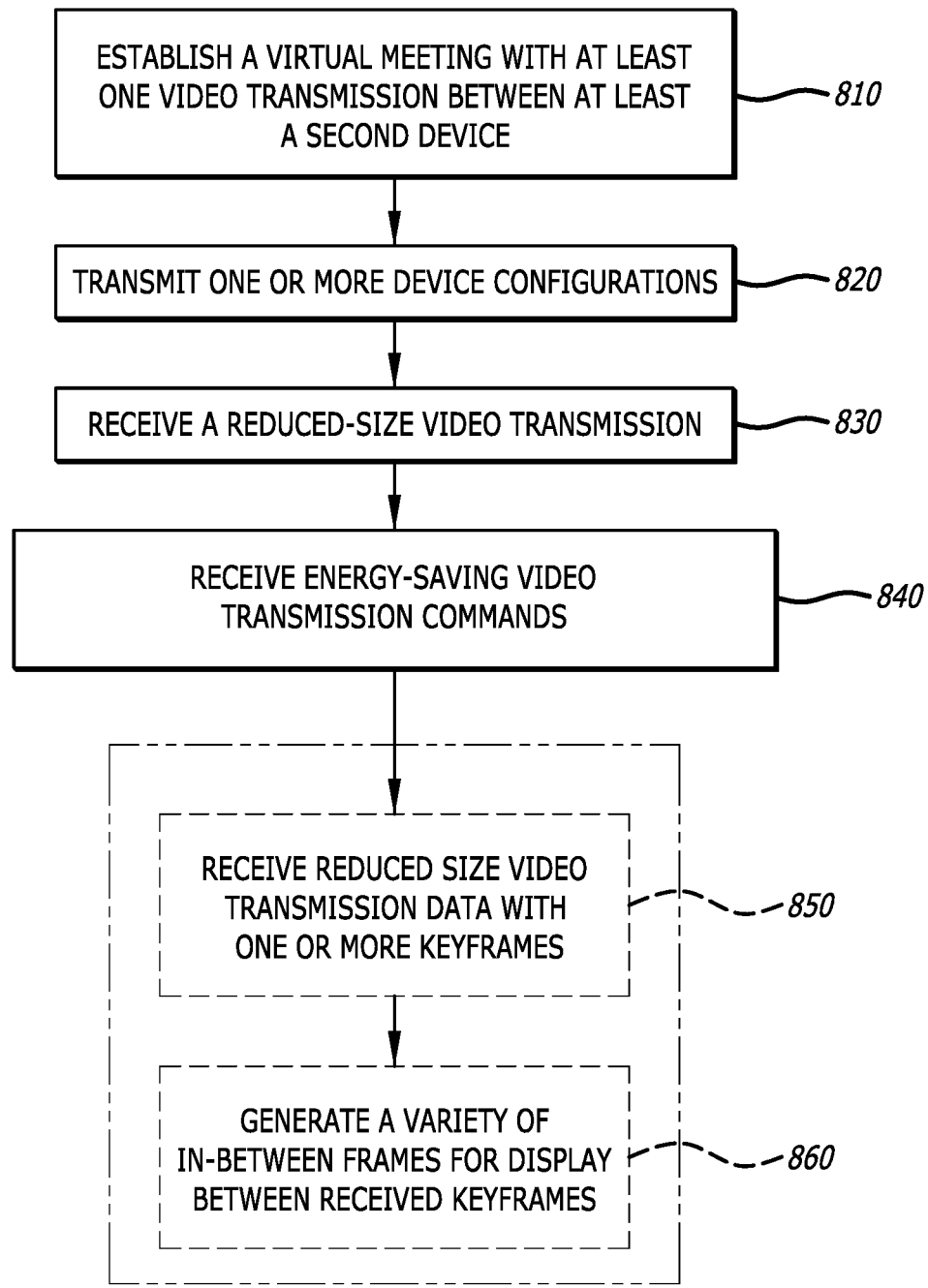
FIG. 8 is a flowchart depicting a process for processing a reduced size video transmission data rate within a virtual meeting user device in accordance with various embodiments of the disclosure.

Referring to FIG. 8, a flowchart depicting a process 800 for processing energy-saving video transmission rate commands within a virtual meeting user device in accordance with various embodiments of the disclosure is shown. In many embodiments, the process 800 can establish a virtual meeting with at least one video transmission between at least a second device (block 810). In these embodiments, it may be possible to establish a virtual meeting without the need for direct contact or assistance with a virtual meeting service server.

In additional embodiments, the process 800 can transmit one or more device configurations (block 820). For example, upon connection between two or more network-connected devices, each device can transmit various configuration data to each other device. Based on the configuration data received, the network-connected device can determine an energy-saving video transmission rate and corresponding reduced size video transmission to utilize. However, in more embodiments, the process 800 can receive a reduced size video transmission (block 830). Based on this, some embodiments may also receive an energy-saving video transmission rate command (block 840). In this way, metadata, or other instruction indicating how to process the received reduced size video transmission can be received and processed. This can also indicate when and how to generate in-between frames as discussed below.

In optional embodiments, the process 800 can continue to receive reduced frame rate video transmission data with one or more selected keyframes (block 850). As discussed above, the received video transmission can be smaller in size because only keyframe data is received, as well as potentially associated metadata or other configuration data. Conversely, in additional optional embodiments the process 800 can generate a variety of in-between frames for display between the received key frames (block 860). In certain embodiments, instead of simply repeating the key frame repeatedly, the process 800 can generate novel frames to display in-between the received keyframes. In certain embodiments, these in-between frames can be generated via a morphing process based on predicted movement or from a newly received key frame. Thus, those skilled in the art will recognize that these embodiments are not utilizing a simple frame rate reduction.

Although a specific embodiment for a process 800 for processing a reduced size video transmission data rate within a virtual meeting user device is described above with respect to FIG. 8, any of a variety of systems and/or processes may be utilized in accordance with embodiments of the disclosure. For example, the generation of in-between frames may be guided or otherwise directed by a virtual meeting service server. The elements described in FIG. 8 may also be interchangeable with other elements of FIGS. 1-7, and 9-11 as required to realize a particularly desired embodiment.

Figure 9:
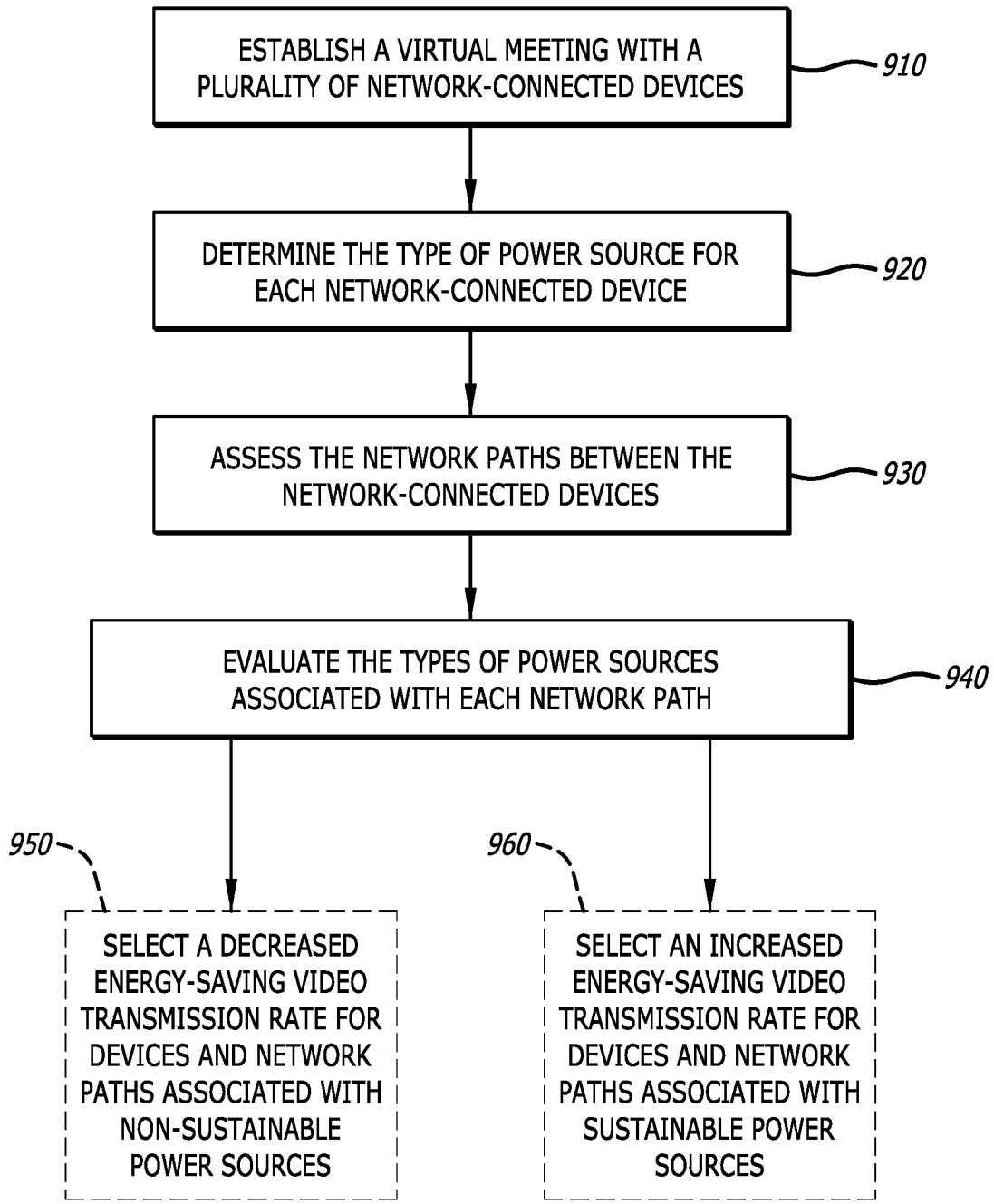
FIG. 9 is a flowchart depicting a process for selecting a reduced size video transmission data rate within a virtual meeting in accordance with various embodiments of the disclosure.

Referring to FIG. 9, a flowchart depicting a process for selecting a reduced size video transmission data rate within a virtual meeting in accordance with various embodiments of the disclosure is shown. As described above, various embodiments may adjust the energy-saving video transmission rate within a virtual meeting. In many embodiments, the process 900 may establish a virtual meeting with a plurality of network-connected devices (block 910).

In more embodiments, the process 900 can determine the type of power source for each network-connected device. As described above, network-connected devices can be powered by different power sources. These power sources can vary from more or less sustainable. Each jump along a network may have different power source types. In various embodiments, the process 900 can assess the network paths between the network-connected devices (block 930). Once assessed, the process 900 can evaluate the types of power sources associated with each network path (block 940). This can include determining the associated sustainability of each power source for network paths.

In some optional embodiments, the process 900 can select a decreased energy-saving video transmission rate for devices and network paths associated with non-sustainable power sources (block 950). Thus, when sending data over a network path or device that is powered from a non-sustainable power source, the process 900 can utilize the decreased energy-saving video transmission rate to result in less data being transmitted over the network thus decreasing negative environmental impacts. Conversely, in additional optional embodiments, the process 900 can select an increased energy-saving video transmission rate for devices and network paths associated with sustainable power sources (block 960). This results in sending more data over network devices and paths that are powered by more sustainable power sources.

Although a specific embodiment for a process for selecting a reduced size video transmission data rate within a virtual meeting based on power source type is described above with respect to FIG. 9, any of a variety of systems and/or processes may be utilized in accordance with embodiments of the disclosure. For example, the determination of power sources may be utilized in conjunction with other sustainability data to determine an energy-saving video transmission rate. The elements described in FIG. 9 may also be interchangeable with other elements of FIGS. 1-8, and 10-11 as required to realize a particularly desired embodiment.

Figure 10:
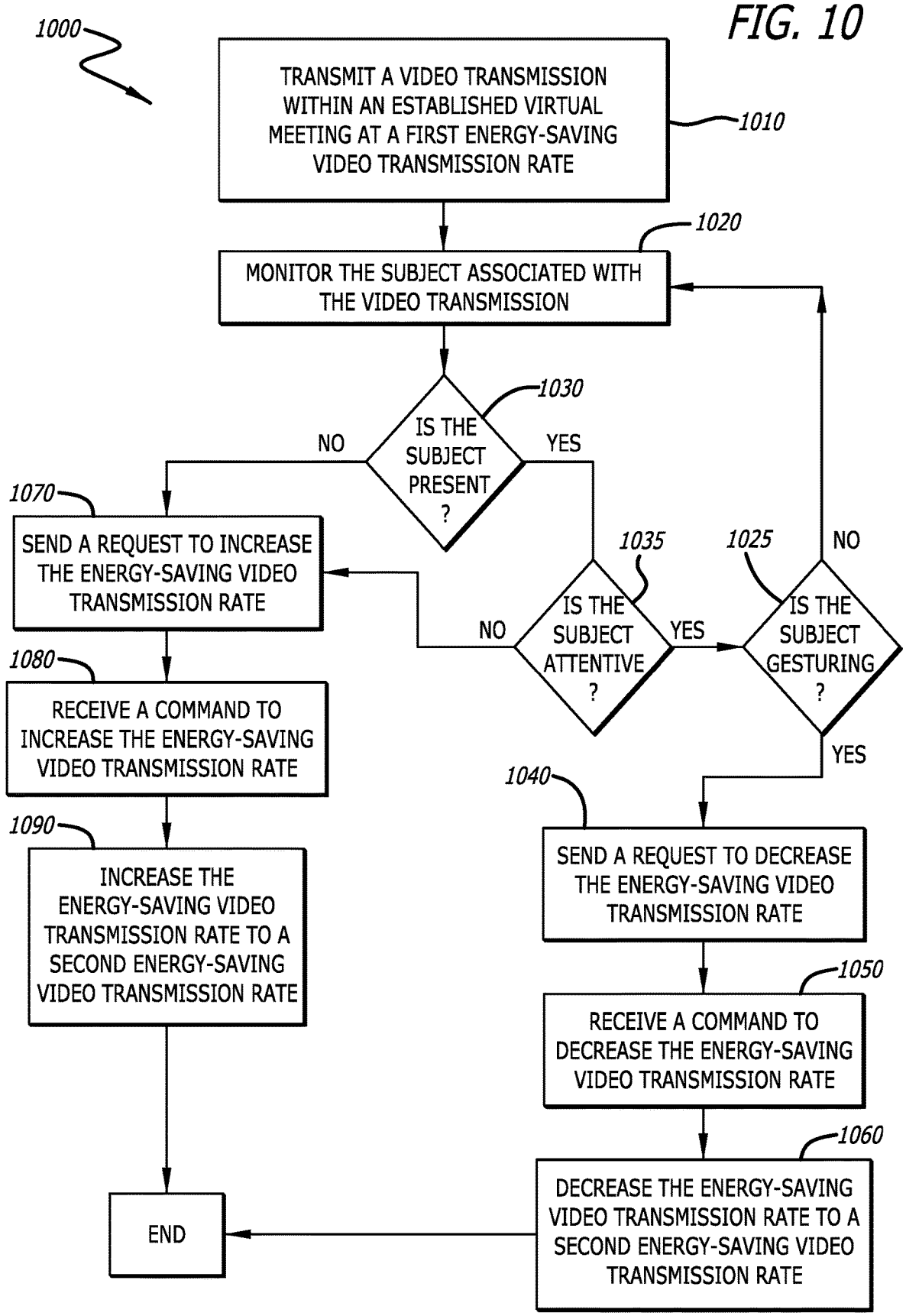
FIG. 10 is a flowchart depicting a process for adjusting the reduced size video transmission data rate in response to one or more events in accordance with various embodiments of the disclosure.

Referring to FIG. 10, a flowchart depicting a process 1000 for adjusting the energy-saving video transmission rate in response to one or more events in accordance with various embodiments of the disclosure is shown. As indicated in FIG. 5, various events may occur during a virtual meeting that can allow for the adjustment of the energy-saving video transmission rate without a decrease in user experience. In many embodiments, the process 1000 can transmit a video transmission within an established virtual meeting at a first energy-saving video transmission rate (block 1010). This energy-saving video transmission rate can be achieved through the use of one or more reduced size video transmission data rate commands being sent to various network-connected devices and/or user clients connected to the virtual meeting.

In more embodiments, the process 1000 can monitor the subject associated with the video transmission (block 1020). The user network-connected device and/or client can be configured to utilize the video transmission recording the user subject to monitor them. This can be done through one or more facial tracking applications, machine learning methods, etc. For example, the process can determine if the subject is even present within the camera range (block 1030). It should be obvious to those skilled in the art that if a subject is not present, then increasing the energy savings of a video transmission via a larger reduced size video transmission data rate will not negatively affect user experiences.

Thus, in response to a subject not being present, the process 1000 can send a request to increase the energy-saving video transmission rate (block 1070). This can be done through one or more reduced size video transmission data rate commands in various embodiments. Specifically, the overall reduced size video transmission data rate can decrease, which can increase the time between selecting keyframes to utilize in the video transmission. Subsequently, the process 1000 can receive a command to increase the energy-saving video transmission rate (block 1080). In these centralized embodiments, the steps of sending and receiving reduced size video transmission data rate commands can be done in conjunction with a virtual meeting service server. However, additional embodiments may generate a reduced size video transmission data rate command internally without the need for communication with an external device.

As a result, the process 1000 can increase the energy-saving video transmission rate to a second energy-saving video transmission rate (block 1090). In some embodiments, the lack of a subject in the camera area may also turn off other features meant to increase user experience, such as, but not limited to, in-between frame generation, etc. In more embodiments, the second energy-saving video transmission rate may be such that no keyframes are selected, or in essence, stopping or otherwise freezing the display of the video transmission until the process 1000 can be repeated such that the camera range is monitored and determined that the user is again present.

When it is determined that the subject is present, the process 1000 can also determine if the subject is attentive to the video transmission (block 1035). A subject within the camera range may be looking at a different portion of the virtual meeting window that isn't displaying a video transmission. In some instances, the subject may be looking at something else within the area that is not the display itself. Therefore, if a user is not paying attention to the video transmission, reducing the video transmission frame rate will not immediately negatively affect the user experience.

Thus, in response to a subject not being attentive, the process 1000 can again send a request to decrease the reduced frame rate (block 1070). This can be done through one or more reduced size video transmission data rate commands in various embodiments which can affect how incoming video transmission are processed and also how outgoing video transmissions are presented to the other virtual meeting participants. Subsequently, the process 1000 can receive a command to increase the energy-saving video transmission rate (block 1080). Again, the result of an increased energy-saving video transmission rate can be that there is a converse decrease in the overall reduced size video transmission rate, which can be accomplished through the selection of fewer keyframes within the video transmission. Once more, in these centralized embodiments, the steps of sending and receiving reduced size video transmission data rate commands can be done in conjunction with a virtual meeting service server. However, additional embodiments may generate a reduced size video transmission data rate command internally without the need for communication with an external device.

As a result, the process 1000 can decrease the reduced size video transmission rate to yield a second energy-saving video transmission rate (block 1090). In some embodiments, the lack of attentiveness by the subject may also trigger the system to turn off other features meant to increase user experience, such as, but not limited to, in-between frame generation, etc. In more embodiments, the second energy-saving video transmission rate may be such that no new keyframes are selected, which may, in essence, stop or otherwise freeze the display of the video transmission until the process 1000 can be repeated such that the camera range is monitored and determined that the user is again present and attentive.

However, when a subject is present and attentive to the video transmission of the virtual meeting, the video transmission of the subject may need to be improved to other users within the virtual meeting. For example, during the virtual meeting, the monitored subject can make a gesture to, for example, get attention of one or more other virtual meeting participants. Thus, the process 1000 can determine if the subject is gesturing (block 1025).

If the subject is determined to be gesturing, then the process 1000 can send a request to decrease the energy-saving video transmission rate (block 1040). This can be done through one or more reduced size video transmission data rate commands in various embodiments. In further embodiments, the process 1000 can receive a command to increase the reduced size video transmission data rate (e.g., by increasing the energy-saving video transmission rate) (block 1050). In some centralized embodiments, the sending and receiving of the increased reduced size video transmission data rate is done through a virtual meeting service server. However, some embodiments may generate the updated reduced size video transmission rate internally. In response to receiving the command, the process 1000 can increase the energy-saving video transmission rate to a second energy-saving video transmission rate (block 1060). In certain embodiments, the second increased energy-saving video transmission rate can be configured to select keyframes that are equivalent to a normal frame rate with no delay between frames. The process 1000 can continue to loop and monitor the subject to adjust the reduced size video transmission data rate period as needed based on the detected events.

Although a specific embodiment for a adjusting the energy-saving video transmission rate of a video transmission of a virtual meeting in response to one or more events is described above with respect to FIG. 10, any of a variety of systems and/or processes may be utilized in accordance with embodiments of the disclosure. For example, the process may be configured to detect other events that may allow for the reduction of data transmitted during the virtual meeting that also does not negatively affect user experiences. The elements described in FIG. 10 may also be interchangeable with other elements of FIGS. 1-9 and 11 as required to realize a particularly desired embodiment.

Figure 11:
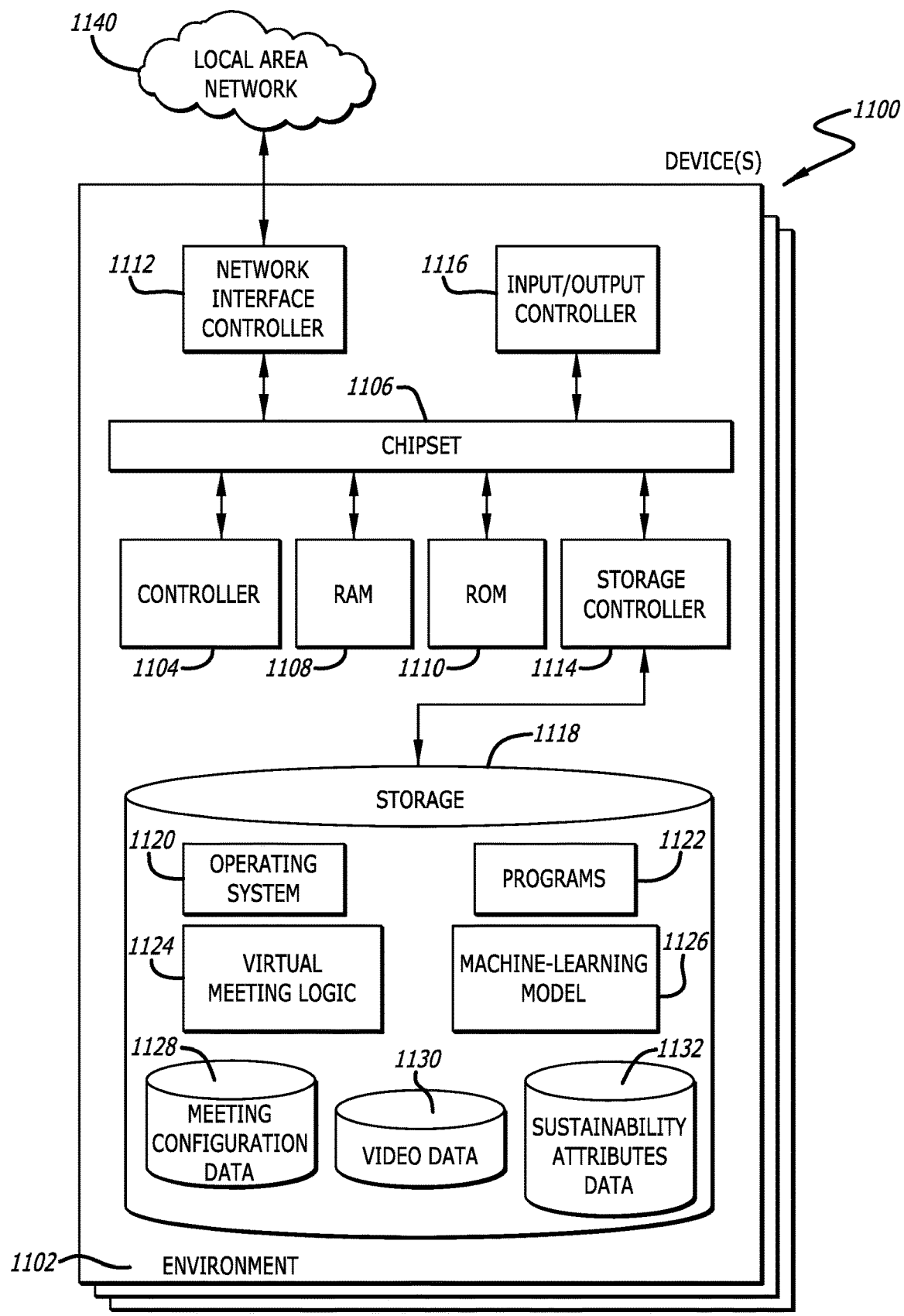
FIG. 11 is a conceptual block diagram of a device suitable for use in a dynamic reduced size video transmission data rate collaboration system in accordance with various embodiments of the disclosure.

Referring to FIG. 11, a conceptual block diagram of a device suitable for use in a dynamic reduced size video transmission data rate collaboration system in accordance with various embodiments of the disclosure is shown. The embodiment of the conceptual block diagram depicted in FIG. 11 can illustrate a conventional server computer, workstation, desktop computer, laptop, tablet, network appliance, e-reader, smartphone, or other computing device, and can be utilized to execute any of the application and/or logic components presented herein. The device 1100 may, in some examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more controller(s) 1104, such as, but not limited to, central processing units (CPUs), processors, etc. that can be configured to operate in conjunction with a chipset 1106. The controller(s) 1104 can be standard programmable CPUs that perform arithmetic and logical operations necessary for the operation of the device 1100.

In additional embodiments, the controller(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the controller(s) 1104 and the remainder of the components and devices within the environment 1102. The chipset 1106 can provide an interface to a random-access memory (RAM 1108), which can be used as the main memory in the device 1100 in some embodiments. In a number of embodiments, the memory can be communicatively coupled to the controller(s) 1104 to carry out one or more instructions. The chipset 1106 can further be configured to provide an interface to a computer-readable storage medium such as a read-only memory (ROM 1110) or non-volatile RAM (NVRAM) for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface controller 1112, which may provide access to external devices through, for example, a plurality of communication ports such as, but not limited to, a network interface card (NIC). A NIC may comprise a gigabit Ethernet adapter or similar component. The plurality of communication ports can be capable of connecting or otherwise coupling the device 1100 to other devices over the network 1140. It is contemplated that multiple communication ports, such as NICs may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, programs 1122, and data, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by a device 1100 or a plurality of devices operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as programs 1122 and transform the device 1100 by specifying how the controller(s) 1104 can transition between states, as described above. In some embodiments, the device 1100 has access to computer-readable storage media storing computer-executable instructions which, when executed by the device 1100, perform the various processes described above with regard to FIGS. 1-10. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11, or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include a virtual meeting logic 1124, that can be configured to perform one or more of the various steps, processes, operations, and/or other methods that are described above. Often, the virtual meeting logic 1124 can be a set of instructions stored within a non-volatile memory that, when executed by the processor(s)/controller(s) 1104 can carry out these steps, etc. In some embodiments, the virtual meeting logic 1124 may be a client application that resides on a network-connected device, such as, but not limited to, a personal or mobile computing device. In these embodiments, the virtual meeting logic 1124 can facilitate the establishment and conduct one or more virtual meetings within the device, such as those devices depicted in FIGS. 1 and 3-4. In certain embodiments, the virtual meeting logic 1124 may be configured to receive and process reduced size video transmission data rate commands and adjust the displayed video transmission based on the receive reduced size video transmission data rate commands/data. In further embodiments, the virtual meeting logic 1124 may generate or otherwise determine a reduced size video transmission data rate based on various data sources and likewise adjust the video transmission both displayed and transmitted such that less data is required to transmit the video transmission stream.

In a number of embodiments, the storage 1118 can include meeting configuration data 1128. As described above, configuration data 1128 can be utilized to optimize the sustainability of a virtual meeting. In some embodiments, the configuration data 1128 can indicate the type of virtual meeting that will be conducted, as well as the types of devices that are likely to attend. The configuration data 1128 may also include, in certain embodiments, the network paths, devices, or types of connections that may be utilized during a virtual meeting.

In various embodiments, the storage 1118 can include video data 1130. Within a virtual meeting, one or more video transmission streams are likely to be utilized by one or more users. The video data 1130 can store, process, and/or display these video transmissions during the virtual meeting(s). In some embodiments, the video data 1130 can include selected key frames, or generated in-between frames. In still further embodiments, video data 1130 may include metadata associated with the video transmission including, but not limited to, reduced size video transmission data rate commands/data.

In still more embodiments, the storage 1118 can include sustainability attributes data 1132. As described above in the discussion of FIG. 2, sustainability attribute data can include sustainability attributes of various devices, elements, and other components of a virtual meeting network. The sustainability attributes data 1132 may comprise both capability data related to various devices but can also include the power source type associated with each device within a network proposed or being utilized by a virtual meeting. In some embodiments, the sustainability attributes data 1132 can include historical data such that decisions or inferences can be generated without all current real-time data, or to make a prediction of upcoming network conditions.

Finally, in many embodiments, data may be processed into a format usable by one or more machine-learning (ML) model(s) 1126 (e.g., feature vectors), and or other pre-processing techniques. The ML model(s) 1126 may be any type of ML model, such as any of various supervised models, reinforcement models, and/or unsupervised models. The ML model(s) 1126 may include one or more of linear regression models, logistic regression models, decision trees, Naïve Bayes models, neural networks, k-means cluster models, random forest models, and/or other types of ML model(s) 1126.

The ML model(s) 1126 can be configured to generate inferences to make predictions or draw conclusions from data. An inference can be considered the output of a process of applying a model to new data. This can occur by learning from historical data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc.

The ML model(s) 1126 may be configured to predict the usage and/or configurations of a better sustainability-optimized virtual meeting. Likewise, the ML model(s) 1126 may be configured in certain embodiments to process video data to make inferences about a subject's presence, actions, or other event that can trigger a change in the reduced size video transmission data rate desired. Finally, in some embodiments, the ML model(s) 1126 may be configured to generate one or more in-between frames of a video transmission received with specific key frames, allowing for an increased or otherwise unchanged user experience with less data being received during the virtual meeting.

Although a specific embodiment for a device suitable for carrying out the various steps, processes, methods, and operations described above is discussed with respect to FIG. 11, any of a variety of systems and/or processes may be utilized in accordance with embodiments of the disclosure. For example, the device may be virtualized or disposed as a logic and data stores within a mobile or personal general computing device, allowing for the transformation of the device, upon execution by a processor/controller, to a virtual meeting device capable of dynamic reduced size video transmission data rate within one or more video transmissions. The elements depicted in FIG. 11 may also be interchangeable with other elements of FIGS. 1-10 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a controller;
   a memory communicatively coupled to the controller;
   a communication port coupled with a second device; and
   a virtual meeting logic configured to:
      establish a virtual meeting wherein the virtual meeting includes at least one video transmission;
      determine a virtual meeting configuration;
      collect sustainability attributes data wherein the sustainability attributes data includes a power source type for at least one network device in a network path of the virtual meeting;
      select an energy-saving video transmission rate based on the collected sustainability attributes data; and
      transmit a reduced size video transmission based on the selected energy-saving video transmission rate.

2. The device of claim 1, wherein the virtual meeting logic is further configured to:
   select a key frame of video for retaining in the at least one video transmission; and
   retain the selected key frame of video until a subsequent keyframe is selected.

3. The device of claim 1, wherein the virtual meeting logic is further configured to dynamically adjust the energy-saving video transmission rate based on a subsequent event in the at least one video transmission.

4. The device of claim 3, wherein the event is related to a subject captured within the at least one video transmission.

5. The device of claim 4, wherein the event is the subject present within the at least one video transmission.

6. The device of claim 4, wherein the event is the subject gesturing on the at least one video transmission.

7. The device of claim 6, wherein the event is the subject gesturing on the at least one video transmission, the virtual meeting logic selects a decreased period of frame delay.

8. The device of claim 1, wherein the virtual meeting configuration includes determining one or more processing capabilities of the device.

9. The device of claim 1, wherein the virtual meeting configuration includes determining an expected number of attendees to the virtual meeting.

10. The device of claim 1, wherein the virtual meeting configuration includes determining a quantity of video transmissions within the virtual meeting.

11. The device of claim 1, wherein the sustainability attributes data includes at least determining a power source type being utilized by the device.

12. The device of claim 11, wherein the selected energy-saving video transmission rate is increased when the power source type being utilized is a non-sustainable power source.

13. A method of conducting a sustainable virtual meeting, comprising:
   establishing a virtual meeting between at least two network-connected devices, wherein the virtual meeting includes at least one video transmission;
   determining a virtual meeting configuration;
   collecting sustainability attributes data, wherein the sustainability attributes data includes a power source type for at least one of the at least two network-connected devices in a network path of the virtual meeting and is associated with:
      the at least two network-connected devices; and
      a set of network paths between the at least two network-connected devices; and
   selecting an energy-saving video transmission rate for each of the at least two network-connected devices based on the collected sustainability attributes data.

14. The method of claim 13, wherein the method further comprises:
   transmitting a plurality of energy-saving video transmission commands to each of the at least two network-connected devices, wherein the energy-saving video transmission commands are configured to direct a network-connected device to transmit a reduced size video transmission during the established virtual meeting.

15. The method of claim 14, wherein the virtual meeting configuration includes determining one or more processing capabilities of the at least two network-connected devices.

16. The method of claim 13, wherein the method further comprises:
   receiving the at least one video transmission;
   processing the received at least one video transmission;
   selecting a frame of video for retaining in the at least one video transmission; and
   transmitting the selected frame of video within the at least one video transmission for the selected energy-saving video transmission rate.

17. The method of claim 16, wherein the virtual meeting configuration includes determining a quantity of video transmissions within the virtual meeting.

18. The method of claim 16, wherein the sustainability attributes data includes at least determining a power source type being utilized by the at least two network-connected devices and the set of network paths between the at least two network-connected devices.

19. The method of claim 18, wherein the selected energy-saving video transmission rate is decreased when the power source type being utilized is a non-sustainable power source.

20. A device, comprising:
a controller;
a memory communicatively coupled to the controller;
a communication port coupled with a second device; and
a virtual meeting logic configured to:
  establish a virtual meeting with at least the second device wherein the virtual meeting includes at least one video transmission;
  transmit one or more device configurations;
  receive reduced frame rate data, wherein the reduced frame rate data is based on at least the one or more device configurations and associated sustainability attributes data wherein the sustainability attributes data includes a power source type for at least one network device in a network path of the virtual meeting; and
  transmit a reduced number of video frames based on the reduced frame rate data.

* * * * *